UNITED STATES PATENT OFFICE.

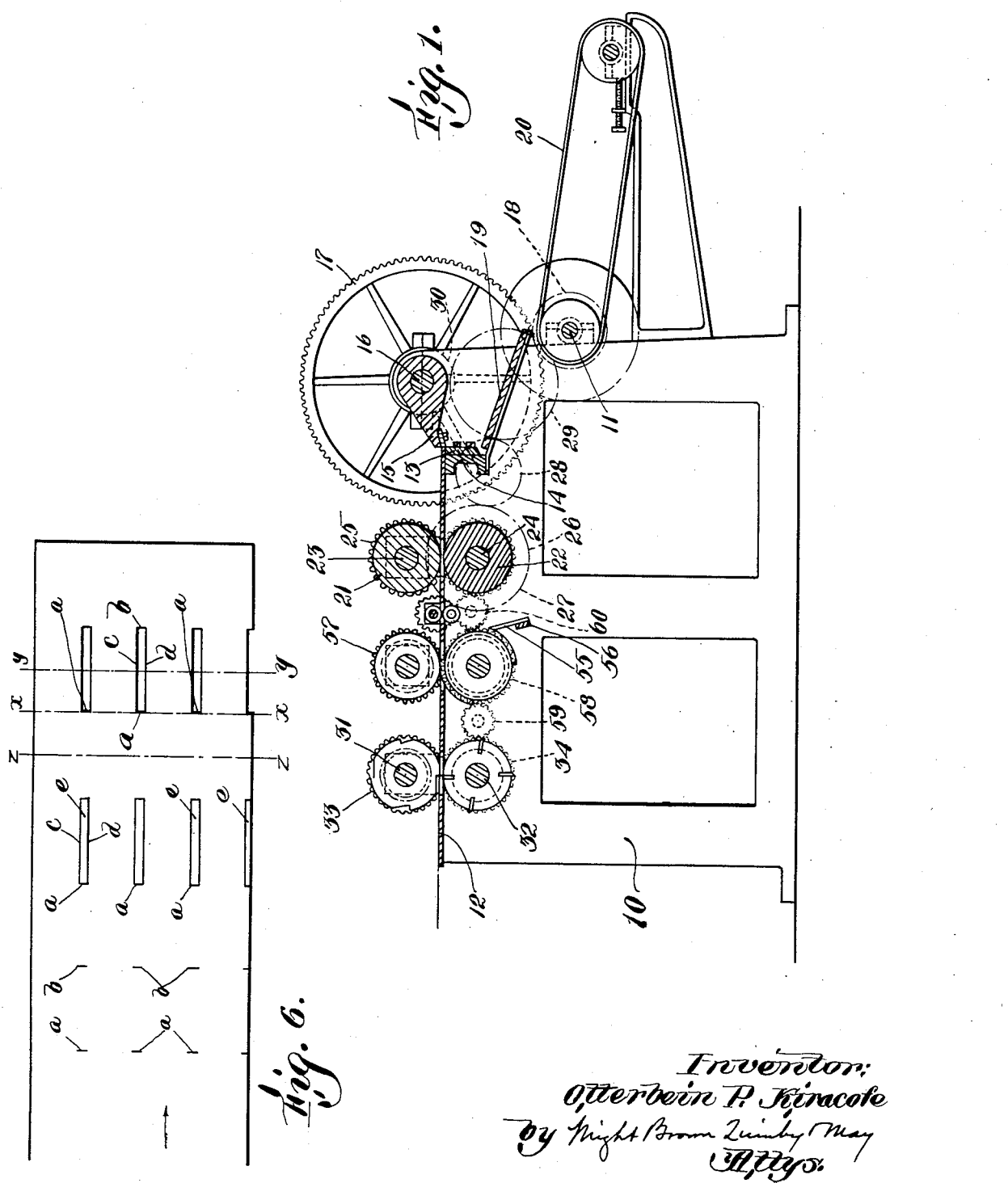

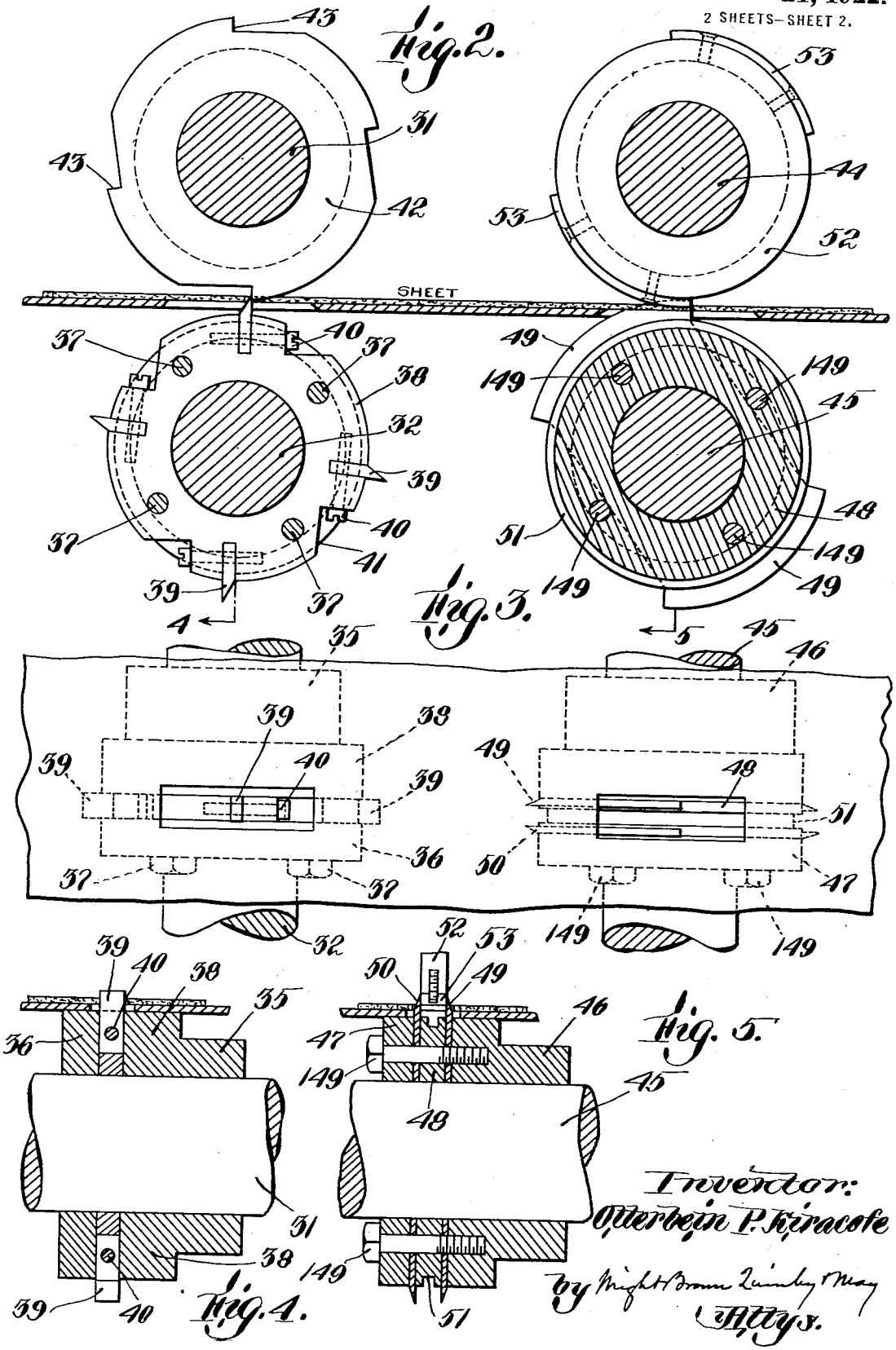

OTTERBEIN P. KIRACOFE, OF EAST RUTHERFORD, NEW JERSEY, ASSIGNOR TO THE FLINTKOTE COMPANY, OF BOSTON, MASSACHUSETTS, A CORPORATION OF MASSACHUSETTS.

ROOFING MACHINE.

1,410,018. Specification of Letters Patent. Patented Mar. 21, 1922.

Application filed July 1, 1919. Serial No. 308,003.

*To all whom it may concern:*

Be it known that I, OTTERBEIN P. KIRACOFE, a citizen of the United States, residing at East Rutherford, in the county of Bergen and State of New Jersey, have invented new and useful Improvements in Roofing Machines, of which the following is a specification.

This invention has relation to machinery for making shingle strips, so called, from sheets of prepared roofing material. Because of the nature of such sheet material, due to the fact that it consists of felt saturated with a waterproof compound of an asphaltic or pitchy nature, coated with a higher-melting-point pitch or asphalt, and surfaced with partially embedded crushed slate or other mineral, it is difficult to provide satisfactory means for cutting the material into the strips. In making cross-cut shingle strips, so-called, in which the strips are successively severed transversely from the end of the advancing sheet, it has become customary to cut transverse spaced rows of longitudinal slots in the sheet, and to sever the strips on lines intersecting the slots of each row. The formation of such slots produces oblong waste pieces which are apt to be carried along with the sheet and to be mixed with the strips, or to clog the rolls or cutters and halt the operation of the machine.

The present invention comprises a machine, in which the waste pieces are adequately disposed of and in which the accuracy of the cutting operations is secured.

On the accompanying drawing,—

Figure 1 illustrates in vertical longitudinal section a machine embodying my invention.

Figure 2 represents, on a larger scale, the cutters for forming the slots, and the table for supporting the moving sheet.

Figure 3 shows the same elements in plan view.

Figures 4 and 5 are longitudinal sections on the lines 4—4 and 5—5 of Figure 2.

Figure 6 shows the sheet of roofing after it has been slotted, and illustrates how the sheet may be transversely severed.

The machine may comprise any usual or suitable framework on which the operative parts are supported. As shown, it has duplicate side standards, of which one is shown at 10, on the ends of which is journaled the main power-shaft 11. The machine is provided with a table or supporting plate 12 for the sheet of roofing material to be formed into shingle strips. The mechanism for cutting the sheet transversely into strips comprises a stationary shear blade 13 (bolted to a cross bar 14), and a rotary chopping knife or blade 15 cooperating therewith. The chopping knife is secured upon a shaft 16 which has a large gear 17 intermeshing with a pinion 18 on the power-shaft 11. At 19 there is an inclined chute for guiding the severed strips to an endless conveyor 20 of any suitable form, the construction of which is not concerned with the present invention. Feed rolls 21, 22, are arranged to feed the sheet through the machine, and they may be of any suitable construction, such as cylinders or spaced pairs of coating disks or wheels. The shafts 23, 24, on which they are mounted, are connected by intermeshing gears 25, 26, and the shaft 22 has also a larger gear indicated conventionally at 27, which, through intervening gears shown conventionally at 28 and 29, is driven by a pinion, indicated conventionally at 30, on the knife shaft 16. As thus far described, the details of the machine do not differ materially from those already in use.

The slot-forming mechanism, which forms a part of the present invention, comprises two sets of cutters, one set operating to cut spaced transverse cuts or slits in the sheet, to form the ends of the slots, and the other set operating to cut parallel longitudinal slits or cuts in the sheet to form the sides of the slots. These sets of cutters are spaced apart longitudinally of the direction of feed of the sheet, each pair of transverse slits to form the ends of a slot being cut before the pair of longitudinal slits are made to form the sides of the slot. The longitudinal-slit forming cutters are so constructed that one of them carries the rectangular waste piece or cutting away from the body of the sheet to a lower plane, where it is detached and deposited under the machine at a point remote from the strips which constitute the product of the machine. The devices for forming the pairs of transverse slits, are mounted on parallel shafts 31, 32, having intermeshing gears 33, 34, and arranged respectively above and below the table 12. On the shaft 32 is secured a series of cutter heads, equal in number to the slots of each transverse row thereof to be formed in the sheet, and spaced apart the desired distance. Each cutter head includes a hub 35 adjustably fixed upon the shaft by any convenient or desirable means, a disk 36 secured to the hub by screws 37, and an intervening blade carrier 38 having notches to receive the blades 39 which are held in place by screws 40. The member 36 is recessed as at 41 to permit the easy insertion and removal of the screws. Each blade has a sharp chisel edge, the straight face of which is radial of the shaft. The blades are arranged in pairs, each blade of each pair cutting one end of the slot to be formed in the sheet. The coacting cutter head is indicated at 42 and is adjustably fixed upon the shaft 31 by any suitable means. It is peripherally recessed to provide two pairs of shear edges 43 for coaction with the two pairs of blades 39 in forming the parallel rows of transverse slits in the sheet, the blades and shear edges of each pair thereof being spaced apart so that the slots when formed will be of the desired length.

The cutting instrumentalities for forming the pairs of longitudinal slits in the sheet, which slits constitute the longitudinal sides of the slots, are mounted on parallel shafts 44, 45, journaled in suitable bearings and located above and below the table. On the shaft 45 there is a series of heads, such as indicated in Figure 5. Each head comprises a hub 46, a disk 47, an intermediate disk 48, and screws 49 for securing these elements together. Between the disk 48, the hub 46 and the disk 47 there are located two cutting blades 49, 50, the operative edges of which project diametrically beyond the peripheries of the disks, and are of such arcuate length as to cut longitudinal slits in the sheet between the transverse slits of each pair thereof. The operative portions of the cutting blades 49 and 50 project upwardly through apertures formed in the table so as to penetrate and extend to a point above the plane of the upper surface of the sheet to be cut. The disk 48 has a continuous peripheral groove 51 for a purpose to be stated. Coacting with each of the heads thus described, there is adjustably secured on the shaft 44 a complemental cutter head which consists of a disk 52 having secured upon its periphery shear blocks 53, the side edges of which coact with the edges of the blades 49 and 50, and which, when in operation, lie between said blades as shown in Figure 5. The operative edges of the blades 49, 50 and the blocks 53, are of the proper length so as to cut the slits in the sheet between the pairs of transverse slits formed by the previously acting cutter heads. The shear blocks 53 perform a further function; that is, they crowd the rectangular waste piece or cutting down into the space between the knives 49 and 50, so that the knives will carry the waste pieces downwardly with them to a point below the table so as entirely to remove them from the sheet. For the purpose of removing the waste pieces or cuttings from each lower cutter head, I provide a stripper or finger 55, the end of which extends into the peripheral groove 51 of the disk 48. These fingers are all secured to a cross bar 56 which extends between the side frames of the machine, as shown in Figure 1. The fingers are set almost vertically so that the waste pieces, which are stripped from the lower cutting heads, are deposited on the floor or in a suitable receptacle placed underneath the table. The shafts 44 and 45 are provided with gears 57, 58, which intermesh, so that the cutter heads may be driven in peripheral unison. A pinion 59 intermeshes with the gears 34 and 58 for transmitting power from the shaft 45 to the shaft 32. A like idler gear 60 meshes with the gears 26 and 58 for transmitting power from shaft 24 to shaft 45. In Figure 6, I have shown the sheet of roofing in the process of being cut into shingle strips. As indicated, the chopping cutter 15 is arranged to coact with the blade 13 in cutting the sheet on a transverse line midway between the ends of the slots a, but it will be understood, of course, that the line of severance may be at either end of the slots. In the event that the line of severance is intermediate the ends of the slots, the sheet is again cut at a point midway between the ends of the slots of one transverse row and the ends of the slots of the next adjacent transverse row, as indicated. For some reasons, I prefer that the line of severance of each shingle strip should be on the dotted line x—x instead of along the dotted lines y—y and z—z. As the sheet passes through the machine, the cutter heads on the shafts 31 and 32 form the rows of transverse slits a, b, which alternately form the ends of the slots. Then, as the sheet continues on its way through the machine, the cutters on the shafts 44, 45, form the rows of longitudinal slits c, d, so that said slits form rectangular slots in the sheet. The cuttings or waste pieces e are carried downwardly below the sheet as previously stated, and are deposited at a point remote from that at which the finished product is delivered.

Having thus explained the nature of my said invention and described a way of making and using the same, although without attempting to set forth all of the forms in which it may be made or all of the modes of its use, what I claim is:

1. A machine for making roofing elements from a sheet of asphaltic roofing material, comprising sheet-feeding means, a pair of coacting cutters for forming pairs of spaced transverse slits in said sheet, and a second pair of coacting cutters for forming pairs of longitudinal slits in said sheets between the pairs of transverse slits, whereby a series of longitudinal slots are formed in said sheet.

2. A machine for making roofing elements from a sheet of asphaltic roofing material, comprising sheet-feeding means, a pair of coacting cutters for forming pairs of spaced transverse slits in said sheet, a second pair of coacting cutters for forming pairs of longitudinal slits in said sheets between the pairs of transverse slits, whereby a series of longitudinal slots are formed in said sheet and the cuttings are removed from the sheet, and means for stripping the cut pieces from said second pair of cutters.

3. A machine for making roofing elements from a sheet of asphaltic roofing material, comprising sheet-feeding means, a transverse series of pairs of coacting cutters, each pair being constructed and arranged to form longitudinally spaced pairs of transverse slits in said sheet, and a second transverse series of pairs of coacting cutters, each pair being constructed and arranged to form transversely spaced pairs of longitudinal slits between the transverse slits of the pairs thereof, whereby a series of transverse rows of slots are formed in said sheet, and means for severing said sheet transversely.

4. A machine for making roofing elements from a sheet of asphaltic roofing material, comprising sheet-feeding means, a transverse series of pairs of coacting cutters, each pair being constructed and arranged to form longitudinally spaced pairs of transverse slits in said sheet, and a second transverse series of pairs of coacting cutters, each pair being constructed and arranged to form transversely spaced pairs of longitudinal slits between the transverse slits of the pairs thereof and to remove the cuttings from the sheet, and means for stripping the waste pieces or cuttings from said second series of pairs of cutters.

5. A machine for making roofing elements from a sheet of asphaltic roofing material, comprising sheet-feeding means, a pair of connecting cutters having edges arranged to form longitudinally spaced pairs of transverse slits in said sheet, a pair of coacting cutters having edges arranged to form transversely spaced pairs of longitudinal slits registering with said transverse slits to form a series of longitudinal slots in said sheet, and a pair of cutters arranged to cut said sheet on transverse lines intersecting said longitudinal slits either at or between the ends thereof.

In testimony whereof I have affixed my signature.

OTTERBEIN P. KIRACOFE.